United States Patent
Miller et al.

(10) Patent No.: US 10,617,978 B1
(45) Date of Patent: Apr. 14, 2020

(54) SUPPORT AND DRAINAGE MATERIAL, FILTER, AND METHOD OF USE

(71) Applicant: Pall Corporation, Port Washington, NY (US)

(72) Inventors: John P. Miller, Cortland, NY (US); Martin Zeiler, Schwaebisch Gmuend (DE)

(73) Assignee: PALL CORPORATION, Port Washingto, NY (US)

( * ) Notice: Subject to any disclaimer, the term of this patent is extended or adjusted under 35 U.S.C. 154(b) by 0 days.

(21) Appl. No.: 16/169,605

(22) Filed: Oct. 24, 2018

(51) Int. Cl.
| | |
|---|---|
| *B01D 29/21* | (2006.01) |
| *B01D 46/52* | (2006.01) |
| *B01D 46/10* | (2006.01) |
| *B01D 39/16* | (2006.01) |
| *B01D 39/10* | (2006.01) |

(52) U.S. Cl.
CPC .......... *B01D 29/21* (2013.01); *B01D 46/103* (2013.01); *B01D 46/522* (2013.01); *B01D 46/523* (2013.01); *B01D 39/10* (2013.01); *B01D 39/16* (2013.01)

(58) Field of Classification Search
CPC ...... B01D 27/07; B01D 29/07; B01D 29/016; B01D 29/031; B01D 29/21; B01D 29/232; B01D 29/333; B01D 29/353; B01D 46/521; B01D 46/522; B01D 46/523; B01D 2201/0407; B01D 2201/0415; B01D 2201/127; B01D 2313/14; B01D 2313/143; B01D 2313/146
USPC ....................................................... 210/493.1
See application file for complete search history.

(56) References Cited

U.S. PATENT DOCUMENTS

| | | | |
|---|---|---|---|
| 3,198,336 | A | 8/1965 | Hyslop |
| 5,263,792 | A | 11/1993 | Davis et al. |
| 5,543,047 | A | 8/1996 | Stoyell et al. |
| 5,552,048 | A | 9/1996 | Miller et al. |
| 6,786,013 | B2 | 9/2004 | Coulton |
| 2004/0131423 | A1 | 7/2004 | Ianniello et al. |
| 2010/0224554 | A1* | 9/2010 | Schindelin ......... B01D 46/0036 210/493.5 |

FOREIGN PATENT DOCUMENTS

EP  0 867 216 A1  9/1998

OTHER PUBLICATIONS

European Patent Office, Extended European Search Report in in counterpart European Application No. 19201963.6, dated Mar. 6, 2020.

* cited by examiner

*Primary Examiner* — Benjamin M Kurtz
(74) *Attorney, Agent, or Firm* — Leydig Voit & Mayer, Ltd.

(57) ABSTRACT

Support and drainage materials, filter including the materials, and methods of use are disclosed.

12 Claims, 4 Drawing Sheets

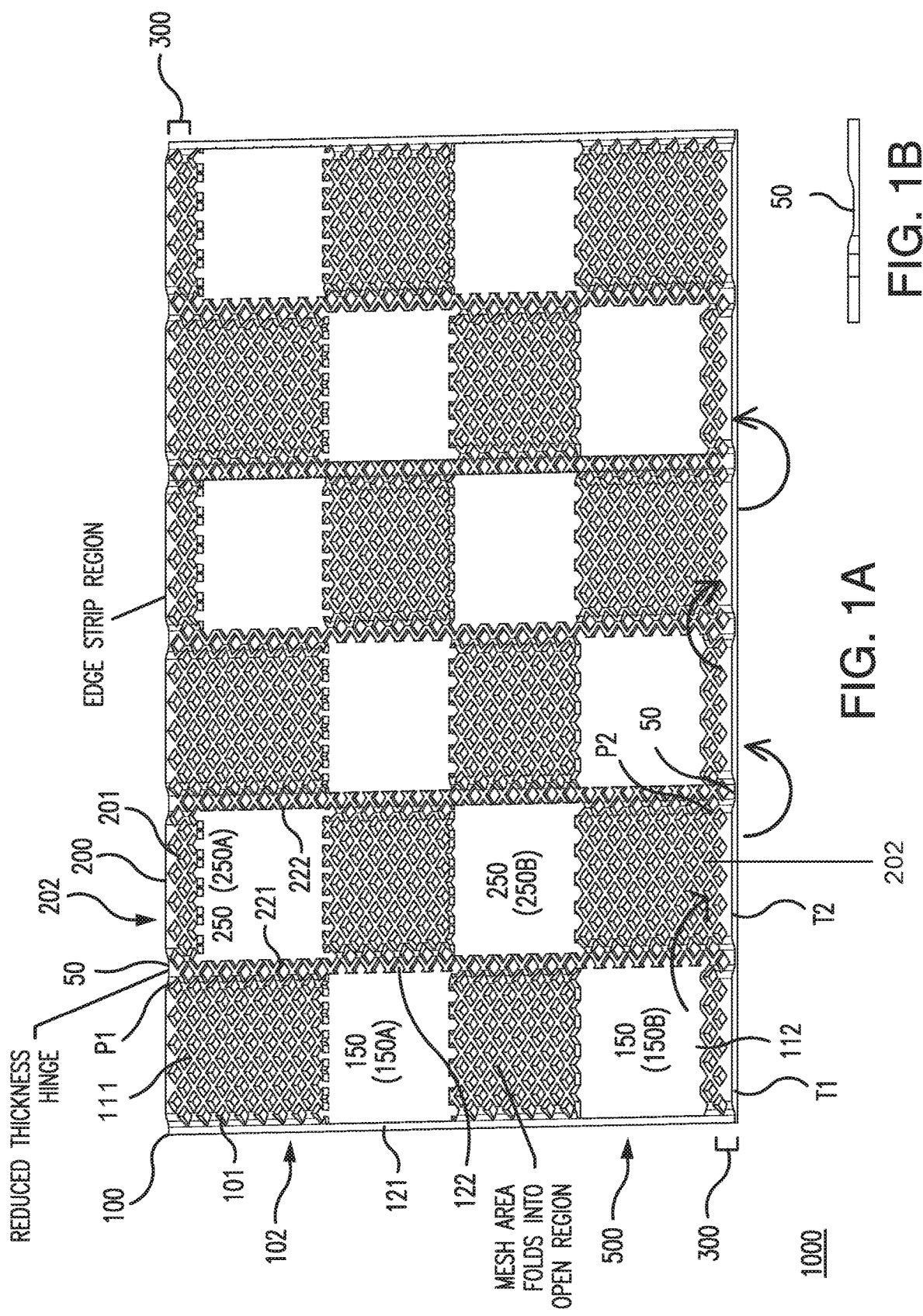

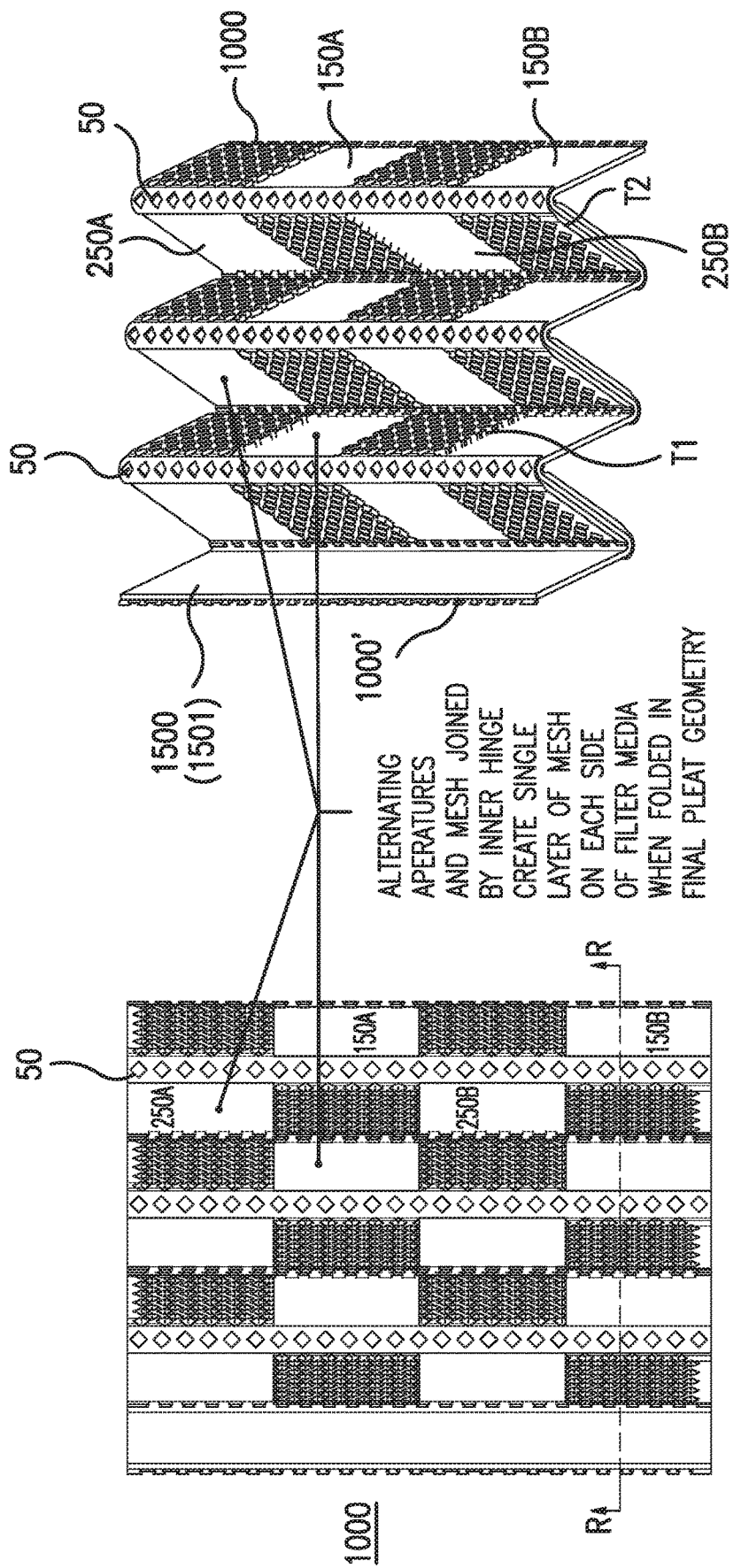

SUPPORT AND DRAINAGE MATERIAL, FILTER, AND METHOD OF USE

BACKGROUND OF THE INVENTION

Figure 2C:
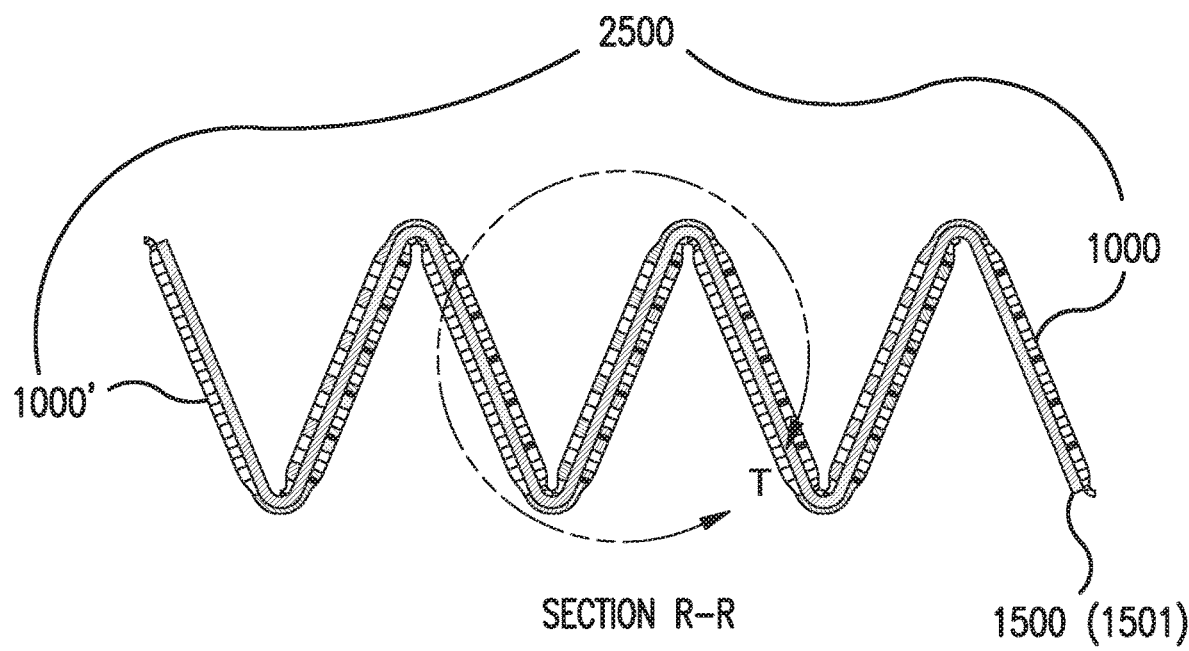

Support and drainage elements such as meshes (also called screens or netting) are utilized in a number of filtration applications, wherein the support and drainage ("S&D") elements are arranged upstream and/or downstream of porous filter media. The support and drainage elements have much larger openings than the pores of the filter media, and provide support to the filter media and/or provide good drainage for the filter media.

However, there is a need for improved support and drainage elements.

The present invention provides for ameliorating at least some of the disadvantages of the prior art. These and other advantages of the present invention will be apparent from the description as set forth below.

BRIEF SUMMARY OF THE INVENTION

An embodiment of the invention provides a support and drainage material comprising a foldable element allowing fluid flow through, the element comprising at least one first section comprising a mesh or a non-woven fabric having a first end and a second end, a first side and a second side, a first major surface and a second major surface, and a first section bulk between the first major surface and the second major surface, the first section bulk having a thickness extending from the first end to a portion of the second end; wherein the at least one first section further comprises at least one first section aperture extending a length of at least about 75% a distance between the first end and the second end, and extending a length of about 2% to about 100% a distance between the first side and the second side; and, at least one second section comprising a mesh or a non-woven fabric having a first end and a second end, a first side and a second side, a first major surface and a second major surface, and a second section bulk between the first major surface and the second major surface, the second section bulk having a thickness extending from the first end to a portion of the second end; wherein the at least one second section further comprises at least one second section aperture extending a length of at least about 75% a distance between the first end and the second end, and extending a length of about 2% to about 100% a distance between the first side and the second side; wherein, when the foldable element is folded, a part of the first section bulk thickness fits in the at least one aperture of the at least one second section, and a part of the second section bulk thickness fits in the at least one aperture of the at least one first section.

In some embodiments, the support and drainage material further comprises an additional first section and an additional second section, wherein the additional first section is foldably connected to the second section, and the additional second section is foldably connected to the additional first section; wherein, when the foldable element is folded, a part of the additional first section bulk thickness fits in the at least one aperture of the additional second section, and a part of the additional second section bulk thickness fits in the at least one aperture of the additional first section.

In another embodiment, a support and drainage material system comprises a first support and drainage material allowing fluid flow through and a second separate support and drainage material allowing fluid flow through; (a) the first support and drainage material comprising a first foldable element allowing fluid flow through, the first foldable element comprising at least one first section comprising a mesh or a non-woven fabric having a first end and a second end, a first side and a second side, a first major surface and a second major surface, and a first section bulk between the first major surface and the second major surface, the first section bulk having a thickness extending from the first end to a portion of the second end; wherein the at least one first section further comprises at least one first section aperture extending a length of at least about 75% a distance between the first end and the second end, and extending a length of about 2% to about 100% a distance between the first side and the second side; and, at least one second section comprising a mesh or a non-woven fabric having a first end and a second end, a first side and a second side, a first major surface and a second major surface, and a second section bulk between the first major surface and the second major surface, the second section bulk having a thickness extending from the first end to a portion of the second end; wherein the at least one second section further comprises at least one second section aperture extending a length of at least about 75% a distance between the first end and the second end, and extending a length of about 2% to about 100% a distance between the first side and the second side; wherein, when the first foldable element is folded, a part of the first section bulk thickness fits in the at least one aperture of the at least one second section, and a part of the second section bulk thickness fits in the at least one aperture of the at least one first section; and, (b) the second support and drainage material comprising a second foldable element allowing fluid flow through, the second foldable element comprising at least one first section comprising a mesh or a non-woven fabric having a first end and a second end, a first side and a second side, a first major surface and a second major surface, and a first section bulk between the first major surface and the second major surface, the first section bulk having a thickness extending from the first end to a portion of the second end; wherein the at least one first section further comprises at least one first section aperture extending a length of at least about 75% a distance between the first end and the second end, and extending a length of about 2% to about 100% a distance between the first side and the second side; and, at least one second section comprising a mesh or a non-woven fabric having a first end and a second end, a first side and a second side, a first major surface and a second major surface, and a second section bulk between the first major surface and the second major surface, the second section bulk having a thickness extending from the first end to a portion of the second end; wherein the at least one second section further comprises at least one second section aperture extending a length of at least about 75% a distance between the first end and the second end, and extending a length of about 2% to about 100% a distance between the first side and the second side; wherein, when the second foldable element is folded, a part of the first section bulk thickness fits in the at least one aperture of the at least one second section, and a part of the second section bulk thickness fits in the at least one aperture of the at least one first section.

A filter arrangement according to an embodiment of the invention comprises a pleated porous filter having a plurality of pleats and having an upstream surface and a downstream surface; and, an embodiment of the support and drainage material, arranged to contact the upstream surface of the pleated porous filter, or to contact the downstream surface of the pleated porous filter.

In another embodiment, a filter system is provided comprising a pleated porous filter having a plurality of pleats and having an upstream surface and a downstream surface; and, an embodiment of the support and drainage material system, wherein the pleated porous filter is arranged between the first support and drainage material and the second support and drainage material.

A method of filtering fluid according to an embodiment of the invention comprises passing a fluid through an embodiment of the filter system, the method including passing fluid through the first support and drainage material, the upstream surface of the pleated porous filter, the downstream surface of the pleated porous filter, and the second support and drainage material.

BRIEF DESCRIPTION OF THE SEVERAL VIEWS OF THE DRAWING(S)

FIG. 1A shows a top view an unfolded support and drainage material according to an embodiment of the invention, wherein the material comprises mesh(es) or non-woven fabric(s), showing a plurality of first and second sections connected by hinges, the sections including apertures, also showing a folding pattern (if the filter media is underneath). FIG. 1B shows a side view of a reduced thickness inner hinge.

Figure 2D:
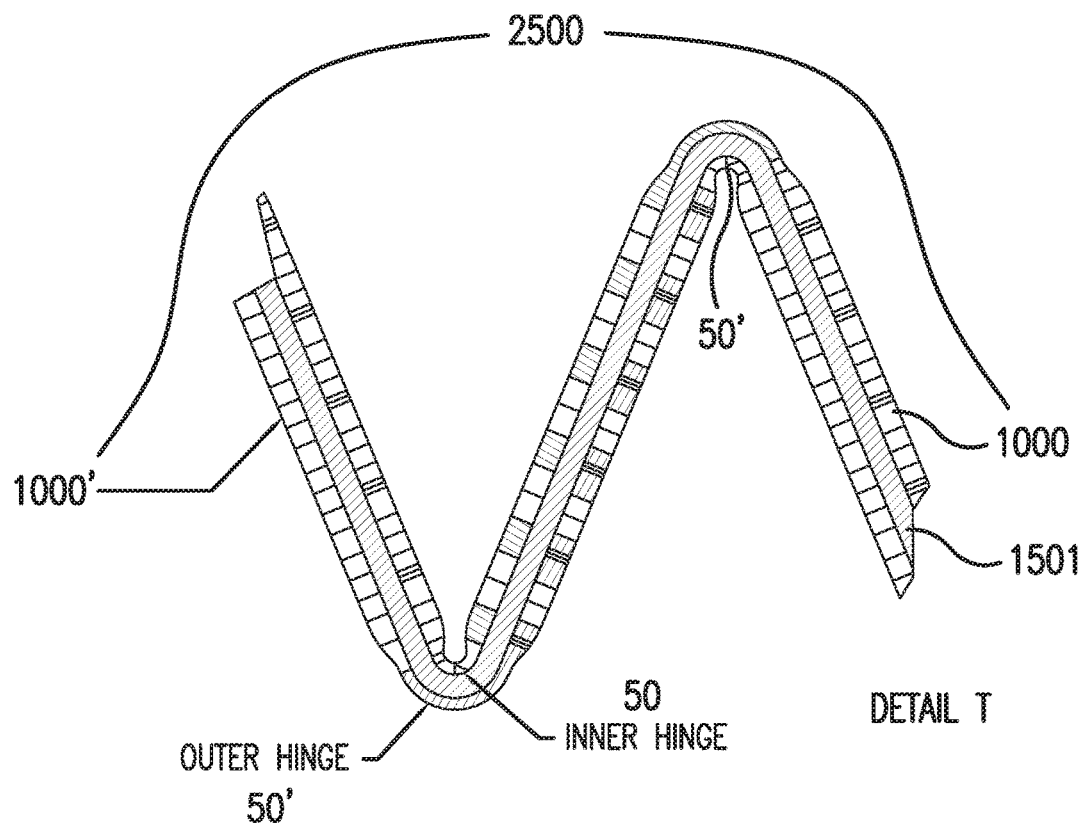

FIG. 2 shows various diagrammatic views of an embodiment of a support and drainage system comprising partially folded first and second support and drainage materials shown in FIG. 1A, with a pleated filter between the first and second support and drainage materials, as well as an embodiment of a filter system comprising a pleated filter between first and second support and drainage materials. FIG. 2A shows a top view, FIG. 2B shows a top perspective view, FIG. 2C show a side view along sectional view R-R as shown in FIG. 2A; FIG. 2D shows an enlarged view of detail T as shown in FIG. 2C.

Figure 3A:
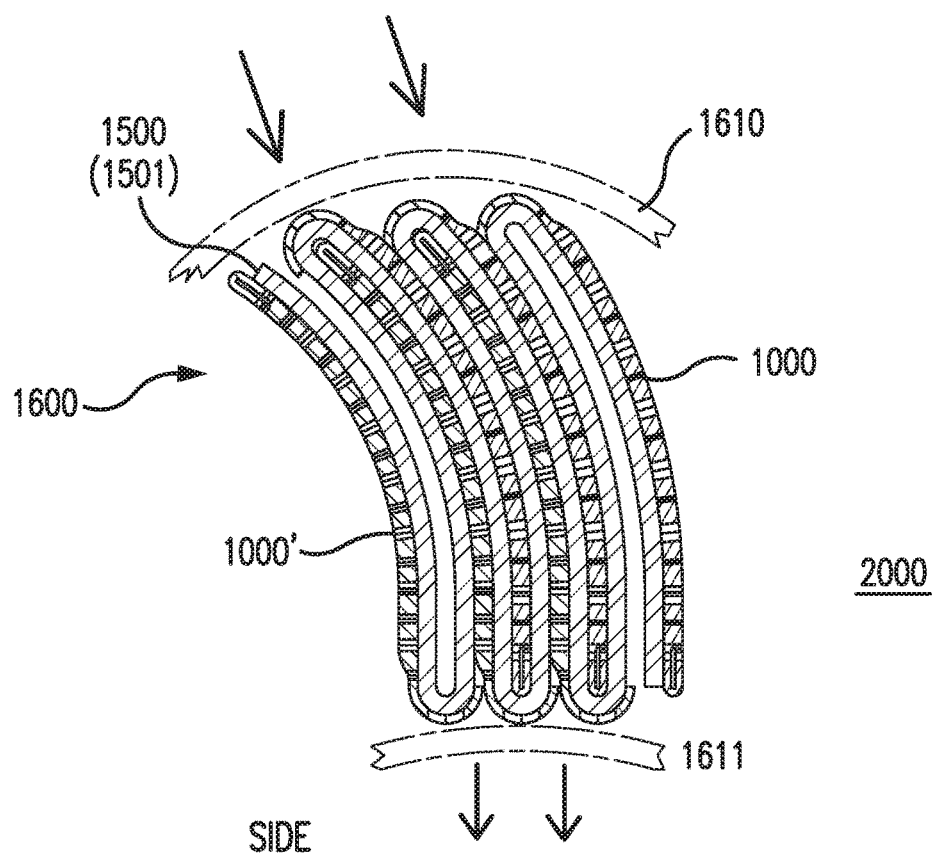
Figure 3B:
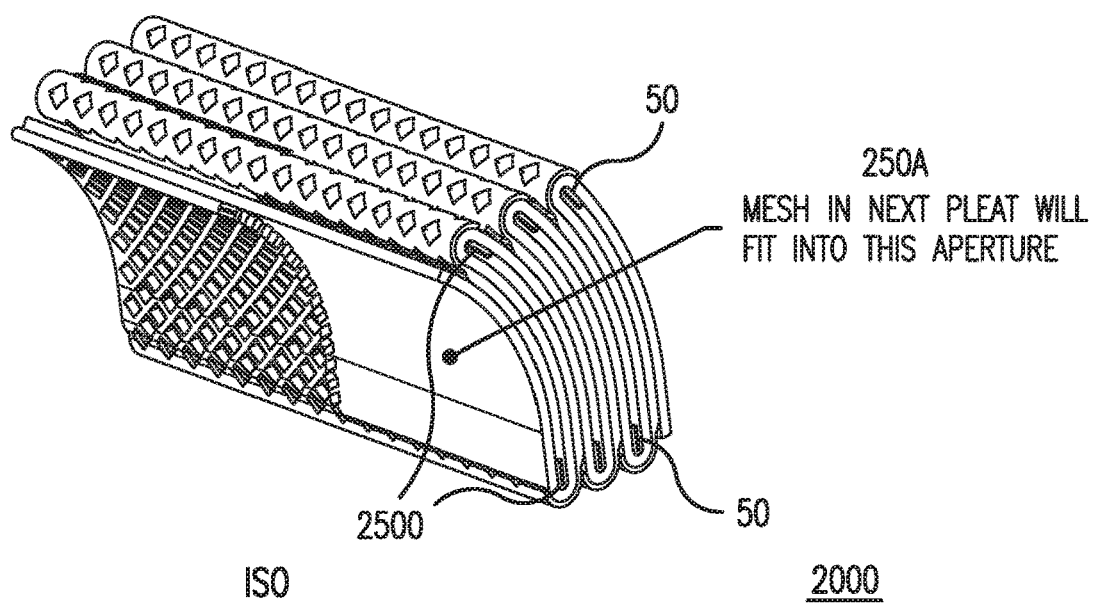

FIG. 3 shows various diagrammatic views of the support and drainage system and the filter system shown in FIGS. 2A-2D, wherein the support and drainage materials are fully folded, and the edge strips have been removed, such that the remaining sides of the support and drainage material are flush with the ends of the filter media, and sealed together to prevent flow. The filter system is illustrated in FIG. 3A as an embodiment of a filter cartridge; and FIG. 3B shows an isometric view.

DETAILED DESCRIPTION OF THE INVENTION

An embodiment of the invention provides a support and drainage material comprising a foldable element allowing fluid flow through, the element comprising at least one first section comprising a mesh or a non-woven fabric having a first end and a second end, a first side and a second side, a first major surface and a second major surface, and a first section bulk between the first major surface and the second major surface, the first section bulk having a thickness extending from the first end to a portion of the second end; wherein the at least one first section further comprises at least one first section aperture extending a length of at least about 75% a distance between the first end and the second end, and extending a length of about 2% to about 100% a distance between the first side and the second side; and, at least one second section comprising a mesh or a non-woven fabric having a first end and a second end, a first side and a second side, a first major surface and a second major surface, and a second section bulk between the first major surface and the second major surface, the second section bulk having a thickness extending from the first end to a portion of the second end; wherein the at least one second section further comprises at least one second section aperture extending a length of at least about 75% a distance between the first end and the second end, and extending a length of about 2% to about 100% a distance between the first side and the second side; wherein, when the foldable element is folded, a part of the first section bulk thickness fits in the at least one aperture of the at least one second section, and a part of the second section bulk thickness fits in the at least one aperture of the at least one first section.

In some embodiments, the support and drainage material further comprises an additional first section and an additional second section, wherein the additional first section is foldably connected to the second section, and the additional second section is foldably connected to the additional first section; wherein, when the foldable element is folded, a part of the additional first section bulk thickness fits in the at least one aperture of the additional second section, and a part of the additional second section bulk thickness fits in the at least one aperture of the additional first section.

In an embodiment of the support and drainage material, the at least one first section has two or more first section apertures, each extending a length of at least about 75% a distance between the first end and the second end, and extending a length of about 2% to about 50% a distance between the first side and the second side; and the at least one second section has two or more single second section apertures, each extending a length of at least about 75% a distance between the first end and the second end, and extending a length of about 2% to about 50% a distance between the first side and the second side. Individual apertures, within a section and/or in different sections, can have different lengths and/or widths. Illustratively, at least one first section aperture and/or at least one second section aperture can extend a length of about 2% to about 50% a distance between the first side and the second side, and at least one second first section aperture and/or at least one second section second aperture can extend a length of about 2% to about 46% a distance between the first side and the second side.

In another embodiment, a support and drainage material system comprises a first support and drainage material allowing fluid flow through and a second separate support and drainage material allowing fluid flow through; (a) the first support and drainage material comprising a first foldable element allowing fluid flow through, the first foldable element comprising at least one first section comprising a mesh or a non-woven fabric having a first end and a second end, a first side and a second side, a first major surface and a second major surface, and a first section bulk between the first major surface and the second major surface, the first section bulk having a thickness extending from the first end to a portion of the second end; wherein the at least one first section further comprises at least one first section aperture extending a length of at least about 75% a distance between the first end and the second end, and extending a length of about 2% to about 100% a distance between the first side and the second side; and, at least one second section comprising a mesh or a non-woven fabric having a first end and a second end, a first side and a second side, a first major surface and a second major surface, and a second section bulk between the first major surface and the second major surface, the second section bulk having a thickness extending from the first end to a portion of the second end; wherein the at least one second section further comprises at least one second section aperture extending a length of at least about 75% a distance between the first end and the second end, and extending a length of about 2% to about 100% a distance between the first side and the second side; wherein, when the first foldable element is folded, a part of the first section bulk thickness fits in the at least one aperture of the at least one second section, and a part of the second section bulk thickness fits in the at least one aperture of the at least one first section; and, (b) the second support and drainage material comprising a second foldable element allowing fluid flow through, the second foldable element comprising at least one first section comprising a mesh or a non-woven fabric having a first end and a second end, a first side and a second side, a first major surface and a second major surface, and a first section bulk between the first major surface and the second major surface, the first section bulk having a thickness extending from the first end to a portion of the second end; wherein the at least one first section further comprises at least one first section aperture extending a length of at least about 75% a distance between the first end and the second end, and extending a length of about 2% to about 100% a distance between the first side and the second side; and, at least one second section comprising a mesh or a non-woven fabric having a first end and a second end, a first side and a second side, a first major surface and a second major surface, and a second section bulk between the first major surface and the second major surface, the second section bulk having a thickness extending from the first end to a portion of the second end; wherein the at least one second section further comprises at least one second section aperture extending a length of at least about 75% a distance between the first end and the second end, and extending a length of about 2% to about 100% a distance between the first side and the second side; wherein, when the second foldable element is folded, a part of the first section bulk thickness fits in the at least one aperture of the at least one second section, and a part of the second section bulk thickness fits in the at least one aperture of the at least one first section.

A filter arrangement according to an embodiment of the invention comprises a pleated porous filter having a plurality of pleats and having an upstream surface and a downstream surface; and, an embodiment of the support and drainage material, arranged to contact the upstream surface of the pleated porous filter, or to contact the downstream surface of the pleated porous filter.

In another embodiment, a filter system is provided comprising a pleated porous filter having a plurality of pleats and having an upstream surface and a downstream surface; and, an embodiment of the support and drainage material system, wherein the pleated porous filter is arranged between the first support and drainage material and the second support and drainage material.

In an embodiment of the filter system, the pleated porous filter comprises a laid-over-pleat filter. Alternatively, or additionally, in an embodiment of the filter system, the system further comprises an inner core and an outer cage.

A method of filtering fluid according to an embodiment of the invention comprises passing a fluid through an embodiment of the filter system, the method including passing fluid through the first support and drainage material, the upstream surface of the pleated porous filter, the downstream surface of the pleated porous filter, and the second support and drainage material.

Advantageously, the support and drainage materials, when placed between layers of filter media (pleated or non-pleated), provide support and uniform spacing (including reducing or preventing nesting wherein strands of mesh on opposing surfaces fit between one another rather than to lie atop one another), while exhibiting reduced edgewise flow resistance (such that the pressure drop in the support and drainage material is less than the pressure drop across the filter element), thereby providing an even distribution of fluid across the surface of the filter element and reduced face loss.

Support and drainage materials can be produced with reduced thicknesses and can be designed to better match flow conditions. When used with a pleated filter, they can reduce filter media (especially membrane) damage and allow more uniform flow distribution (including flow through the pleated tip of the filter), and provide a stable pleat-pack. Additionally, in contrast with conventional pleated filters having two layers or sheets of support and drainage material between individual pleats, when used with a pleated filter, a single layer or sheet of support and drainage material can be used, reducing waste, and allowing more filter material to be used (and in some applications allowing an overall thinner pleat pitch and more filter material in a given volume), while maintaining a desirable pressure differential, and improving filtration efficiency. Additionally, support and drainage materials including hinges are compatible with conventional pleating devices.

The support and drainage material can be flat or planar, or substantially flat or planar, and in some embodiments, the support and drainage material is or can be curved.

Embodiments of the invention are suitable for use with a variety of filter configurations, including flat pleat filter packs, direct flow spiral filters, stacked disk filters, cross-flow cassettes, and are particularly suitable for "laid-over-pleat" (LOP) filter configurations (as described in, for example, U.S. Pat. No. 5,543,047).

Each of the components of the invention will now be described in more detail below, wherein like components have like reference numbers. Where upstream and downstream S&D materials are each illustrated with the same components, the corresponding components are identified with similar reference numbers, followed by "'", e.g., 100' corresponds to 100; 200' corresponds to 200, 1000' corresponds to 1000, etc.

FIG. 1A shows a top view of an unfolded support and drainage material 1000 according to an embodiment of the invention, wherein the material comprises a foldable element 500 allowing fluid flow through, the element comprising mesh(es) or non-woven fabric(s), showing at least one first section 100 and at least one second section 200 connected by hinges 50, the sections including apertures 150, 250, also showing a folding pattern represented by arrows. The at least one first section 100 comprises a mesh or a non-woven fabric having a first end 121 and a second end 122, a first side 111 and a second side 112, a first major surface 101 and a second major surface 102, and a first section bulk T1 between the first major surface and the second major surface, the first section bulk having a thickness extending from the first end to a portion P1 of the second end (i.e., the bulk thickness extends from the first end to the second end where no aperture is present); wherein the at least one first section further comprises at least one first section aperture 150, extending a length of at least about 75% a distance between the first end and the second end, and extending a length of about 2% to about 100% a distance between the first side and the second side; and, the at least one second section 200 comprising a mesh or a non-woven fabric having a first end 221 and a second end 222, a first side 201 and a second side 202, a first major surface and a second major surface, and a second section bulk T2 between the first major surface and the second major surface, the second section bulk having a thickness extending from the first end to a portion P2 of the second end (i.e., the bulk thickness extends from the first end to the second end where no aperture is present); wherein the at least one second section further comprises at least one second section aperture 250 extending a length of at least about 75% a distance between the first end and the second end, and extending a length of about 2% to about 100% a distance between the first side and the second side; wherein, when the foldable element is folded (as discussed in more detail, and as shown in, for example, FIGS. 2B, 2D, 3A and 3B), a part of the first section bulk thickness fits in the at least one aperture of the at least one second section, and a part of the second section bulk thickness fits in the at least one aperture of the at least one first section.

Preferably, when the hinge 50 is utilized as an inner hinge, e.g., with respect to a S&D material system as shown in FIG. 2D, the hinge has a reduced thickness (as shown in more detail in FIG. 1B) to essentially provide a single layer of S&D material on each side of a pleated filter medium when the S&D material is folded.

The embodiment illustrated in FIG. 1A includes edge strips 300 that are typically removed in assembling the filter system (comprising S&D materials upstream and downstream of the pleated porous filter). Thus, when referring to the lengths of distances between the first side and the second side of various apertures, the measurement refers to the portion of the first or second section contacting the edge of the edge strip where the strip is to be cut/removed.

Preferably, and as shown in FIGS. 1A, 2A-2D, 3A, and 3B, embodiments of the support and drainage material further comprise a plurality of first sections and second sections, e.g., a plurality of additional first sections and a plurality of additional second sections (preferably providing a continuous sheet along the length of the filter), wherein an additional first section is foldably connected to the second section, and an additional second section is foldably connected to the additional first section (and so on); wherein, when the foldable element is folded, a part of the additional first section bulk thickness fits in the at least one aperture of the additional second section, and a part of the additional second section bulk thickness fits in the at least one aperture of the additional first section.

Typically, and as also shown in FIGS. 1A, 2A, and 2B, the first and/or second section includes a plurality of apertures, e.g., wherein the at least one first section has two or more first section apertures 150A, 150B, each extending a length of at least about 75% a distance between the first end and the second end, and extending a length of about 25% to about 50% a distance between the first side and the second side; and the at least one second section has two or more single second section apertures 250A, 250B, each extending a length of at least about 75% a distance between the first end and the second end, and extending a length of about 25% to about 50% a distance between the first side and the second side.

Embodiments of support and drainage materials can be arranged upstream of downstream of pleated porous filters to provide an embodiment of a filter arrangement. Preferably, embodiments of support and drainage material systems comprise an embodiment of a first support and drainage material arranged upstream of a pleated porous filter, and an embodiment of a second support and drainage material arranged downstream of the pleated porous filter, also providing an embodiment of a filter system comprising the support and drainage material system and the pleated porous filter.

FIGS. 2A-2D show various diagrammatic views of an embodiment of a support and drainage system 2500 comprising partially folded first (upstream) and second (downstream) support and drainage materials 1000, 1000' (1000 is shown in FIG. 1, wherein 1000' has the same structure) with a porous pleated filter 1500 comprising a porous pleated filter element 1501 between the first and second support and drainage materials, as well as an embodiment of a filter system 2000 comprising the porous pleated filter 1500 between first and second support and drainage materials 1000, 1000'.

FIG. 2A shows a top view, FIG. 2B shows a top perspective view, FIG. 2C shows a side view along sectional view R-R as shown in FIG. 2A; FIG. 2D shows an enlarged view of detail T as shown in FIG. 2C, wherein FIG. 2D shows reduced thickness at the inner hinges 50, 50' folding in on themselves and supporting the pleat roots of the pleated filter (outer hinges can have reduced thickness or non-reduced thickness). When the support and drainage materials are fully folded, a part of one section's bulk thickness fits in an aperture of another section, in effect, providing a single layer of support and drainage material. Advantageously, compression of the mesh(es) or non-woven fabric(s) is avoided or minimized, as edgeflow resistance would likely increase in the compressed regions leading to poor pressure drop performance.

FIGS. 3A-3B show various diagrammatic views of the support and drainage system and the filter system shown in FIGS. 2A-2D, wherein the support and drainage materials are fully folded, and the edge strips have been removed, such that the remaining sides of the support and drainage material are flush with the ends of the filter media, and sealed together to prevent flow.

Embodiments with curved or curvable support and drainage materials are particularly suitable for laid-over-pleat (LOP) filter configurations (as described in, for example, U.S. Pat. No. 5,543,047). For example, FIG. 3A shows an embodiment of a filter system 2000 (also shown in FIG. 3B) comprising a filter cartridge 1600 comprising a filter cage 1610, an inner core 1611, and a porous LOP filter 1500 comprising a porous pleated filter element 1501, and embodiments of support and drainage materials as generally shown in FIGS. 2A-2D (providing an embodiment of a S&D element system 2500) arranged between each pleat of the pleated filter, such that two surfaces of each material contacts a face of each filter pleat, and tips of the material contacts that inner surface of the outer cage and inner core, spacing the pleat tips and pleat roots away from the cage and core, thus protecting the pleat tip and pleat root, while allowing fluid flow therethough.

The support and drainage materials (meshes and fabrics) can be fabricated from any suitable material which is suitable for the fluid being filtered and for the applicable filtration parameters such as temperature.

The support and drainage materials can be produced by a variety of methods known in the art, including, for example, additive manufacturing (sometimes referred to as "additive layer manufacturing" or "3D printing").

In those embodiments comprising meshes wherein the meshes are polymeric, polymeric meshes come in the form of woven meshes and extruded meshes. Either type may be employed, but extruded meshes can be preferable because they are smoother and therefore produce less abrasion of adjoining layers of the filter media. An extruded mesh may have a first set of parallel strands and a second set of parallel strands intersecting the first set of strands at an angle. Extruded meshes may be classified as either symmetrical or non-symmetrical. In a symmetrical mesh, neither of the first or second sets of strands extends in the so-called "machine direction" of the mesh, which is the direction in which the mesh emerges from the mesh manufacturing machine. In a non-symmetrical mesh, one of the sets of strands extends parallel to the machine direction. Either symmetrical or non-symmetrical meshes can be used in accordance with embodiments of the invention.

A variety of meshes are suitable for use in accordance with embodiments of the invention. For example, suitable extruded polymeric meshes include those available from Schweiter-Mauduit International Inc. (Alpharetta, Ga.) under the trade name DELNET.

Meshes can be characterized by their thickness and by the number of strands per inch. These dimensions are not limited to any particular values and can be chose in accordance with the desired edgewise flow characteristics of the mesh and the desired strength. Typically, the mesh with have a mesh count of at least about 5 strands per inch.

In those embodiments comprising non-woven fabrics wherein the fabrics are polymeric, the non-woven fabric can be fabricated from any polymeric material, including polyester, polypropylene, or polyamide (e.g., nylon) which is suitable for the fluid being filtered and for the applicable filtration parameters such as temperature.

A variety of non-woven fabrics are suitable for use in accordance with embodiments of the invention. For example suitable non-woven fabrics include polyester spunbonded non-woven fabrics available from Avintiv Technical Non-wovens (Old Hickory, Tenn.) under the trade names REEMAY (e.g., REEMAY 2011 and REEMAY 2250) and TYPAR.

Typically, the mesh or non-wovens have a thickness in the range of from about 0.0005" to about 0.025" (more typically from about 0.005" to about 0.030"), and a void fraction of about 30% or more, but thicknesses can be greater or lesser than that range, and the void fraction can be less than that value. In those embodiments wherein the mesh or non-woven is folded and/or corrugated, the mesh or non-woven is sufficiently pliable to avoid damage to the mesh or non-woven and to the filter and filter element.

A porous filter and/or a porous filter element (e.g., a porous membrane and/or a porous fibrous medium) can have any suitable pore structure, e.g., a pore size (for example, as evidenced by bubble point, or by $K_L$ as described in, for example, U.S. Pat. No. 4,340,479, or evidenced by capillary condensation flow porometry), a pore rating, a pore diameter (e.g., when characterized using the modified OSU F2 test as described in, for example, U.S. Pat. No. 4,925,572), or removal rating that reduces or allows the passage therethrough of one or more materials of interest as the fluid is passed through the element. The pore structure used depends on the composition of the fluid to be treated, and the desired effluent level of the treated fluid.

The filter element can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. The surface characteristics of the element can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction.

The filter can include additional elements, layers, or components, that can have different structures and/or functions, e.g., prefiltration upstream of the filter media and/or cushioning (cushioning upstream of the filter media for damage protection or cushioning downstream of the filter media for damage protection and/or media support).

In accordance with embodiments of the invention, the filter and/or filter element can have a variety of configurations, including planar, pleated, and hollow cylindrical.

Exemplary filters and filter elements, including pleated filters, are disclosed in U.S. Pat. Nos. 5,543,047 and 5,552,048.

The filter, in some embodiments comprising a plurality of filter elements is typically disposed in a housing comprising at least one inlet and at least one outlet and defining at least one fluid flow path between the inlet and the outlet, wherein the filter is across the fluid flow path, to provide a filter device. Preferably, the filter device is sterilizable. Any housing of suitable shape and providing at least one inlet and at least one outlet may be employed.

The housing can be fabricated from any suitable rigid impervious material, including any impervious thermoplastic material, which is compatible with the fluid being processed. For example, the housing can be fabricated from a metal, such as stainless steel, or from a polymer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A support and drainage material comprising:
a foldable element allowing fluid flow through, the foldable element comprising:
   at least one first section comprising a mesh or a non-woven fabric having a first end of the at least one first section and a second end of the at least one first section, a first side of the at least one first section and a second side of the at least one first section, a first major surface of the at least one first section and a second major surface of the at least one first section, and a first section bulk of the at least one first section between the first major surface of the at least one first section and the second major surface of the at least one first section, the first section bulk having a thickness extending from the first end of the at least one first section to a portion of the second end of the at least one first section; wherein the at least one first section further comprises at least one first section aperture extending a length of at least about 75% a distance between the first end of the at least one first section and the second end of the at least one first section, and extending a length of about 2% to about 100% a distance between the first side of the at least one first section and the second side of the at least one first section; and,
   at least one second section comprising a mesh or a non-woven fabric having a first end of the at least one second section and a second end of the at least one second section, a first side of the at least one second section and a second side of the at least one second section, a first major surface of the at least one second section and a second major surface of the at least one second section, and a second section bulk of the at least one second section between the first major surface of the at least one second section and the second major surface of the at least one second section, the second section bulk having a thickness extending from the first end of the at least one second section to a portion of the second end of the at least one second section; wherein the at least one second section further comprises at least one second section aperture extending a length of at least about 75% a distance between the first end of the at least one second section and the second end of the at least one second section, and extending a length of about 2% to about 100% a distance between the first side of the at least one second section and the second side of the at least one second section;
   wherein, when the foldable element is folded, a part of the first section bulk thickness fits in the at least one second section aperture, and a part of the second section bulk thickness fits in the at least one first section aperture.

2. The support and drainage material of claim 1, further comprising an additional first section comprising a mesh or a non-woven fabric having a first end of the additional first section and a second end of the additional first section, a first side of the additional first section and a second side of the additional first section, a first major surface of the additional first section and a second major surface of the additional first section, and a first additional section bulk between the first major surface of the additional first section and the second major surface of the additional first section, the first additional section bulk having a thickness extending from the first end of the additional first section to a portion of the second end of the additional first section; wherein the additional first section further comprises at least one additional section aperture extending a length of at least about 75% a distance between the first end of the additional first section and the second end of the additional first section, and extending a length of about 2% to about 100% a distance between the first side of the additional first section and the second side of the additional first section; and an additional second section comprising a mesh or a non-woven fabric having a first end of the additional second section and a second end of the additional second section, a first side of the additional second section and a second side of the additional second section, a first major surface of the additional second section and a second major surface of the additional second section, and a second section bulk of the additional second section between the first major surface of the additional second section and the second major surface of the additional second section, the second additional section bulk having a thickness extending from the first end of the additional second section to a portion of the second end of the additional second section; wherein the additional second section further comprises at least one second section aperture extending a length of at least about 75% a distance between the first end of the additional second section and the second end of the additional second section, and extending a length of about 2% to about 100% a distance between the first side of the additional second section and the second side of the additional second section;
wherein the additional first section is foldably connected to the at least one second section, and the additional second section is foldably connected to the additional first section;
   wherein, when the foldable element is folded, a part of the additional first section bulk thickness fits in the at least one additional second section aperture, and a part of the additional second section bulk thickness fits in the at least one additional first section aperture.

3. The support and drainage material of claim 1, wherein the at least one first section has two or more first section apertures, each extending a length of at least about 75% a distance between the first end of the at least one first section and the second end of the at least one first section, and extending a length of about 2% to about 50% a distance between the first side of the at least one first section and the second side of the at least one first section; and
   the at least one second section has two or more single second section apertures, each extending a length of at least about 75% a distance between the first end of the at least one second section and the second end of the at least one second section, and extending a length of about 2% to about 50% a distance between the first side of the at least one second section and the second side of the at least one second section.

4. A support and drainage material system comprising:
a first support and drainage material allowing fluid flow through and a second separate support and drainage material allowing fluid flow through;
(a) the first support and drainage material comprising a first foldable element allowing fluid flow through, the first foldable element comprising:

at least one first section comprising a mesh or a non-woven fabric having a first end of the at least one first section and a second end of the at least one first section, a first side of the at least one first section and a second side of the at least one first section, a first major surface of the at least one first section and a second major surface of the at least one first section, and a first section bulk between the first major surface of the at least one first section and the second major surface of the at least one first section, the first section bulk having a thickness extending from the first end of the at least one first section to a portion of the second end of the at least one first section; wherein the at least one first section further comprises at least one first section aperture extending a length of at least about 75% a distance between the first end of the at least one first section and the second end of the at least one first section, and extending a length of about 2% to about 100% a distance between the first side of the at least one first section and the second side of the at least one first section; and, at least one second section comprising a mesh or a non-woven fabric having a first end of the at least one second section and a second end of the at least one second section, a first side of the at least one second section and a second side of the at least one second section, a first major surface of the at least one second section and a second major surface of the at least one second section, and a second section bulk between the first major surface of the at least one second section and the second major surface of the at least one second section, the second section bulk having a thickness extending from the first end of the at least one second section to a portion of the second end of the at least one second section; wherein the at least one second section further comprises at least one second section aperture extending a length of at least about 75% a distance between the first end of the at least one second section and the second end of the at least one second section, and extending a length of about 2% to about 100% a distance between the first side of the at least one second section and the second side of the at least one second section;

wherein, when the first foldable element is folded, a part of the first section bulk thickness fits in the at least one second section aperture, and a part of the second section bulk thickness fits in the at least one first section aperture; and, (b) the second separate support and drainage material comprising a second foldable element allowing fluid flow through, the second foldable element comprising:

at least one first section comprising a mesh or a non-woven fabric having a first end and a second end, a first side and a second side, a first major surface and a second major surface, and a first section bulk between the first major surface of the at least one first section of the second separate support and drainage material and the second major surface of the at least one first section of the second separate support and drainage material, the first section bulk having a thickness extending from the first end of the at least one first section of the second separate support and drainage material to a portion of the second end of the at least one first section of the second separate support and drainage material;

wherein the at least one first section of the second separate support and drainage material further comprises at least one first section aperture extending a length of at least about 75% a distance between the first end of the at least one first section of the second separate support and drainage material and the second end of the at least one first section of the second separate support and drainage material, and extending a length of about 2% to about 100% a distance between the first side of the at least one first section of the second separate support and drainage material and the second side of the at least one first section of the second separate support and drainage material; and, at least one second section comprising a mesh or a non-woven fabric having a first end and a second end, a first side and a second side, a first major surface and a second major surface, and a second section bulk between the first major surface of the at least one second section of the second separate support and drainage material and the second major surface of the at least one second section of the second separate support and drainage material, the second section bulk having a thickness extending from the first end of the at least one second section of the second separate support and drainage material to a portion of the second end of the at least one second section of the second separate support and drainage material; wherein the at least one second section of the second separate support and drainage material further comprises at least one second section aperture extending a length of at least about 75% a distance between the first end of the at least one second section of the second separate support and drainage material and the second end of the at least one second section of the second separate support and drainage material, and extending a length of about 2% to about 100% a distance between the first side of the at least one second section of the second separate support and drainage material and the second side of the at least one second section of the second separate support and drainage material;

wherein, when the second foldable element is folded, a part of the first section bulk thickness of the at least one first section of the second separate support and drainage material fits in the at least one second section aperture of the at least one second section aperture of the at least one second section of the second separate support and drainage material, and a part of the second section bulk thickness of the at least one second section of the second separate support and drainage material fits in the at least one first section aperture aperture of the at least one first section of the second separate support and drainage material.

5. A filter arrangement comprising:

a pleated porous filter having an upstream surface and a downstream surface, the upstream surface having a first upstream end and a second upstream end, and the downstream surface having a first downstream end and a second downstream end; and the support and drainage material of claim 1, arranged to contact the upstream surface of the pleated porous filter, or to contact the downstream surface of the pleated porous filter.

6. A filter system comprising:
a pleated porous filter having an upstream surface and a downstream surface, the upstream surface having a first upstream end and a second upstream end, and the downstream surface having a first downstream end and a second downstream end; and
the support and drainage material system of claim 4 wherein the pleated porous filter is arranged between the first support and drainage material and the second separate support and drainage material.

7. The filter system of claim 6, wherein the pleated porous filter comprises a laid-over-pleat filter.

8. The filter system of claim 6, further comprising an inner core and an outer cage.

9. A method of filtering fluid, the method comprising passing a fluid through a filter system comprising a pleated porous filter having an upstream surface and a downstream surface, the upstream surface having a first upstream end and a second upstream end, and the downstream surface having a first downstream end and a second downstream end; and
the support and drainage material system of claim 4 wherein the pleated porous filter is arranged between the first support and drainage material and the second separate support and drainage material;
including passing fluid through the first support and drainage material, the upstream surface of the pleated porous filter, the downstream surface of the pleated porous filter, and the second separate support and drainage material.

10. A filter arrangement comprising:
a pleated porous filter having an upstream surface and a downstream surface, the upstream surface having a first upstream end and a second upstream end, and the downstream surface having a first downstream end and a second downstream end; and
a support and drainage material comprising a foldable element allowing fluid flow through, the foldable element comprising:
at least one first section comprising a mesh or a non-woven fabric having a first end of the at least one first section and a second end of the at least one first section, a first side of the at least one first section and a second side of the at least one first section, a first major surface of the at least one first section and a second major surface of the at least one first section, and a first section bulk of the at least one first section between the first major surface of the at least one first section and the second major surface of the at least one first section, the first section bulk having a thickness extending from the first end of the at least one first section to a portion of the second end of the at least one first section; wherein the at least one first section further comprises at least one first section aperture extending a length of at least about 75% a distance between the first end of the at least one first section and the second end of the at least one first section, and extending a length of about 2% to about 100% a distance between the first side of the at least one first section and the second side of the at least one first section; and,
at least one second section comprising a mesh or a non-woven fabric having a first end of the at least one second section and a second end of the at least one second section, a first side of the at least one second section and a second side of the at least one second section, a first major surface of the at least one second section and a second major surface of the at least one second section, and a second section bulk of the at least one second section between the first major surface of the at least one second section and the second major surface of the at least one second section, the second section bulk having a thickness extending from the first end of the at least one second section to a portion of the second end of the at least one second section; wherein the at least one second section further comprises at least one second section aperture extending a length of at least about 75% a distance between the first end of the at least one second section and the second end of the at least one second section, and extending a length of about 2% to about 100% a distance between the first side of the at least one second section and the second side of the at least one second section;
wherein, when the foldable element is folded, a part of the first section bulk thickness fits in the at least one second section aperture, and a part of the second section bulk thickness fits in the at least one first section aperture;
the support and drainage material further comprising an additional first section comprising a mesh or a non-woven fabric having a first end of the additional first section and a second end of the additional first section, a first side of the additional first section and a second side of the additional first section, a first major surface of the additional first section and a second major surface of the additional first section, and a first additional section bulk between the first major surface of the additional first section and the second major surface of the additional first section, the first additional section bulk having a thickness extending from the first end of the additional first section to a portion of the second end of the additional first section; wherein the additional first section further comprises at least one additional section aperture extending a length of at least about 75% a distance between the first end of the additional first section and the second end of the additional first section, and extending a length of about 2% to about 100% a distance between the first side of the additional first section and the second side of the additional first section;
and an additional second section comprising a mesh or a non-woven fabric having a first end of the additional second section and a second end of the additional second section, a first side of the additional second section and a second side of the additional second section, a first major surface of the additional second section and a second major surface of the additional second section, and a second section bulk of the additional second section between the first major surface of the additional second section and the second major surface of the additional second section, the second additional section bulk having a thickness extending from the first end of the additional second section to a portion of the second end of the additional second section; wherein the additional second section further comprises at least one second section aperture extending a length of at least about 75% a distance between the first end of the additional second section and the second end of the additional second section, and extending a length of about 2% to about 100% a distance between the first side of the additional second section and the second side of the additional second section;
wherein the additional first section is foldably connected to the at least one second section, and the additional second section is foldably connected to the additional first section;
wherein, when the foldable element is folded, a part of the additional first section bulk thickness fits in the at least one additional second section aperture, and a part of the additional second section bulk thickness fits in the at least one additional first section aperture;

arranged to contact the upstream surface of the pleated porous filter, or to contact the downstream surface of the pleated porous filter.

11. A filter arrangement comprising:

a pleated porous filter having an upstream surface and a downstream surface, the upstream surface having a first upstream end and a second upstream end, and the downstream surface having a first downstream end and a second downstream end; and the support and drainage material of claim 3, arranged to contact the upstream surface of the pleated porous filter, or to contact the downstream surface of the pleated porous filter.

12. A method of filtering fluid, the method comprising passing a fluid through a filter system comprising a pleated porous filter comprising a laid-over-pleat filter having an upstream surface and a downstream surface, the upstream surface having a first upstream end and a second upstream end, and the downstream surface having a first downstream end and a second downstream end; and the support and drainage material system of claim 4 wherein the pleated porous filter is arranged between the first support and drainage material and the second separate support and drainage material;

including passing fluid through the first support and drainage material, the upstream surface of the pleated porous filter, the downstream surface of the pleated porous filter, and the second separate support and drainage material.

\* \* \* \* \*